United States Patent [19] [11] Patent Number: 6,079,160
Bonds [45] Date of Patent: *Jun. 27, 2000

[54] CORE METAL INSERT WITH STAGGER AND OFFSET BACKBONE

[75] Inventor: Roy L. Bonds, Valley City, Ohio

[73] Assignee: Arrowhead Industries Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/006,264

[22] Filed: Jan. 13, 1998

[51] Int. Cl.7 .......................................................... E06B 7/16
[52] U.S. Cl. ................................................................ 49/490.1
[58] Field of Search ................................... 49/490.1, 440, 49/441, 475.1; 428/573, 595, 596

[56] References Cited

U.S. PATENT DOCUMENTS

| | | |
|---|---|---|
| 1,267,978 | 5/1918 | Collinson . |
| 2,290,842 | 7/1942 | Bush . |
| 3,108,338 | 10/1963 | Stec et al. . |
| 3,145,434 | 8/1964 | Major . |
| 3,222,769 | 12/1965 | Le Plae . |
| 3,256,577 | 6/1966 | Bright . |
| 4,074,465 | 2/1978 | Bright . |
| 4,099,765 | 7/1978 | Bright . |
| 4,107,898 | 8/1978 | Andrzejewski et al. . |
| 4,188,424 | 2/1980 | Ohno et al. . |
| 4,196,546 | 4/1980 | Bright . |
| 4,271,634 | 6/1981 | Andrzejewski . |
| 4,304,816 | 12/1981 | Bright et al. . |
| 4,305,187 | 12/1981 | Iwamura et al. . |
| 4,310,164 | 1/1982 | Mesnel . |
| 4,348,443 | 9/1982 | Hein . |
| 4,430,374 | 2/1984 | Ezaki . |
| 4,610,907 | 9/1986 | Elvira . |
| 4,745,665 | 5/1988 | Hilsenbeck . |
| 4,749,203 | 6/1988 | Bright . |
| 4,921,118 | 5/1990 | Gass . |
| 5,302,466 | 4/1994 | David et al. . |
| 5,305,552 | 4/1994 | Guillon . |
| 5,752,345 | 5/1998 | Bright et al. ............................. 49/490.1 |
| 5,783,312 | 7/1998 | Laughman et al. ................. 49/490.1 X |

OTHER PUBLICATIONS

Abstract of JP Patent No. 62–16827, Jan. 26, 1987, Toyoda Gosei Co. Ltd., Atsuo Kikuchi.

*Primary Examiner*—Jerry Redman
*Attorney, Agent, or Firm*—Pearne & Gordon LLP

[57] ABSTRACT

An elongate metal insert or carrier for reinforcing a weatherseal having a covering of flexible material. The metal insert has opposed and longitudinally extending first and second edges. A plurality of longitudinally spaced apart first slots transversely extend from the first edge and a plurality of longitudinally spaced apart second slots transversely extend from the second edge in an alternating manner. The second slots are longitudinally offset from the first slots and transversely overlap the first slots. A longitudinally extending continuous connection interrupts the second slots and is offset from the centerline of the insert. The continuous connection defines the neutral axis of the weatherseal which does not permit expansion or contraction and therefore prevents shrinkage of the weatherseal at that point. The continuous connection, and therefore the neutral axis, is preferably located adjacent a sealing member to reduce bulb roll over or lip flattening problems.

27 Claims, 4 Drawing Sheets

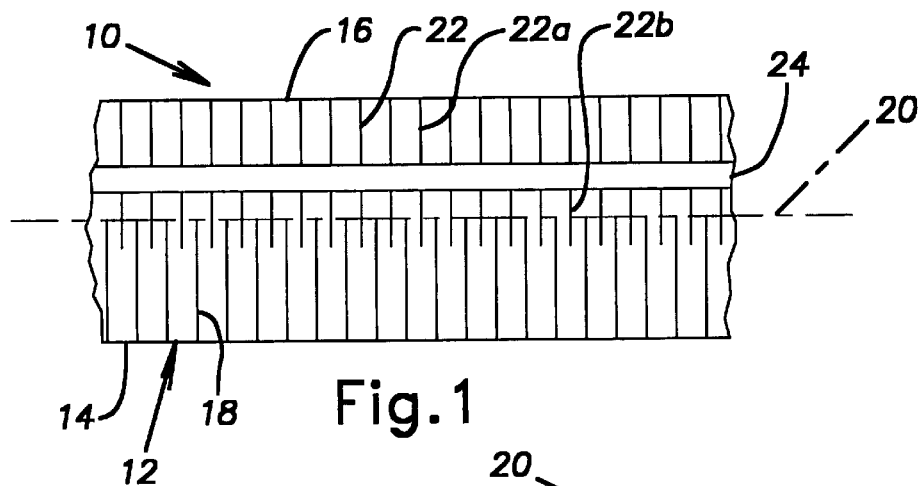
Fig.1
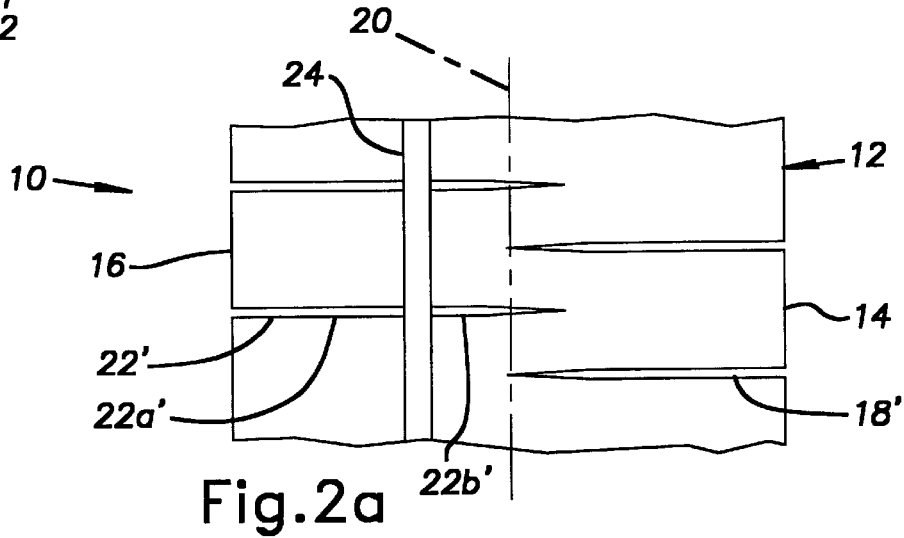
Fig.2a
Fig.2b
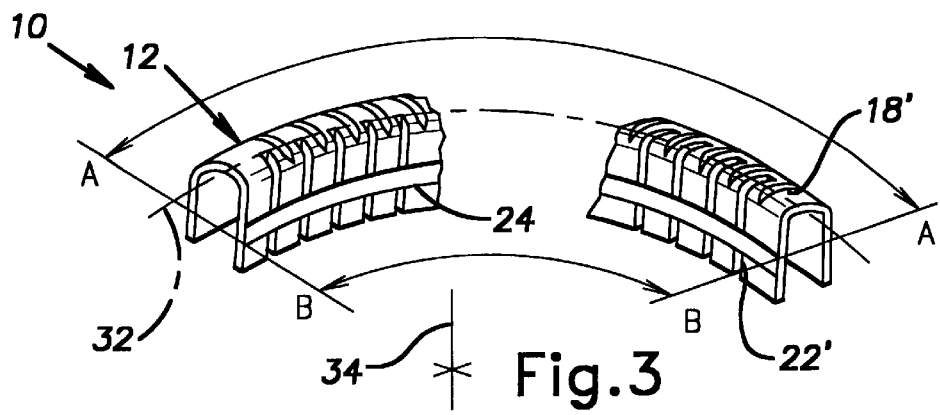
Fig.3

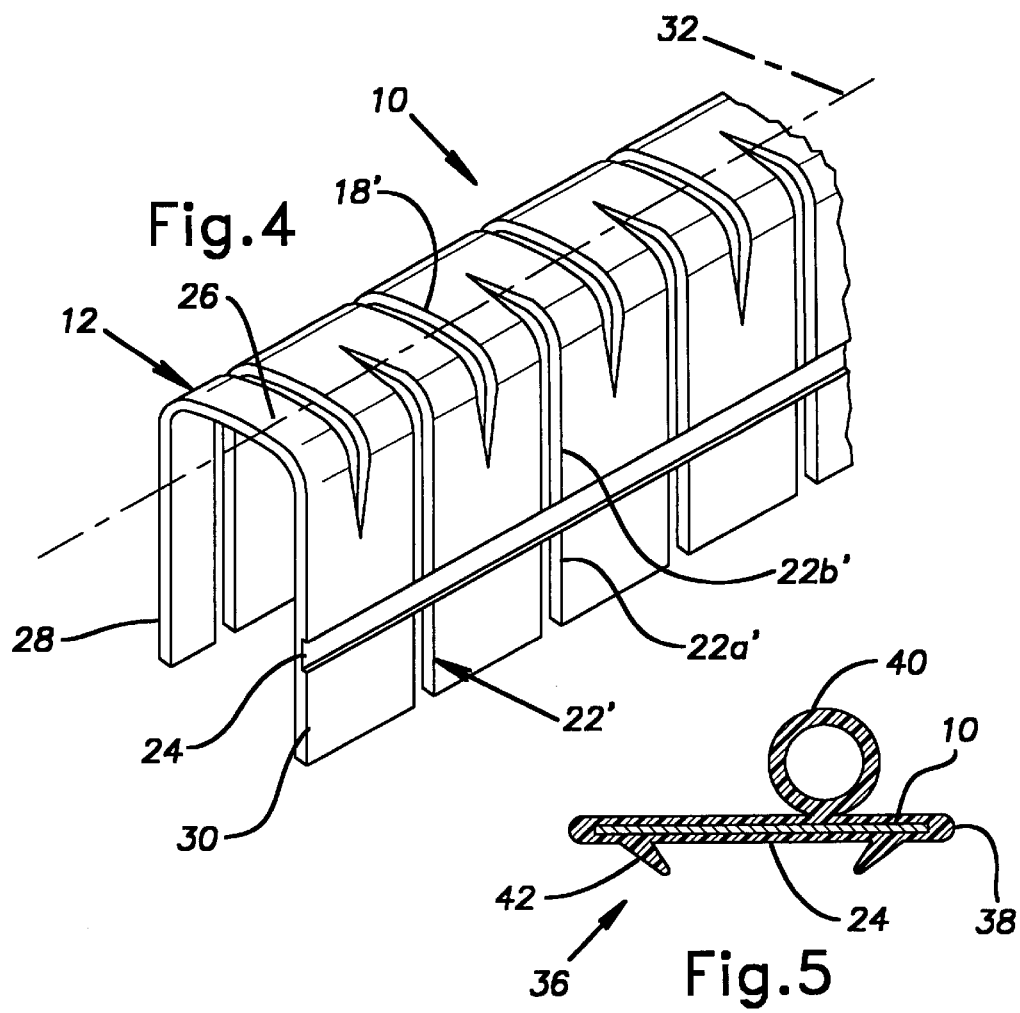
Fig.4
Fig.5
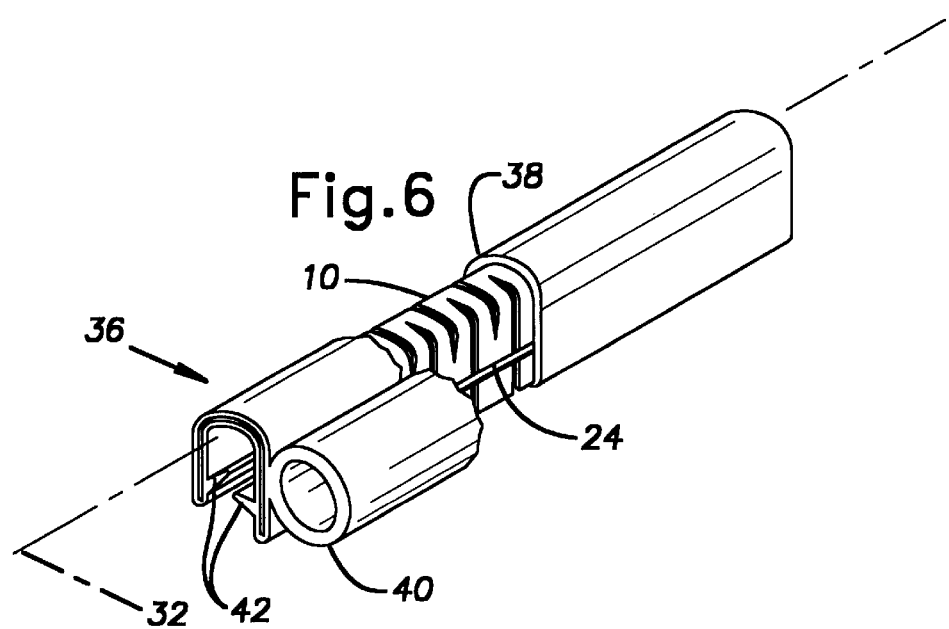
Fig.6

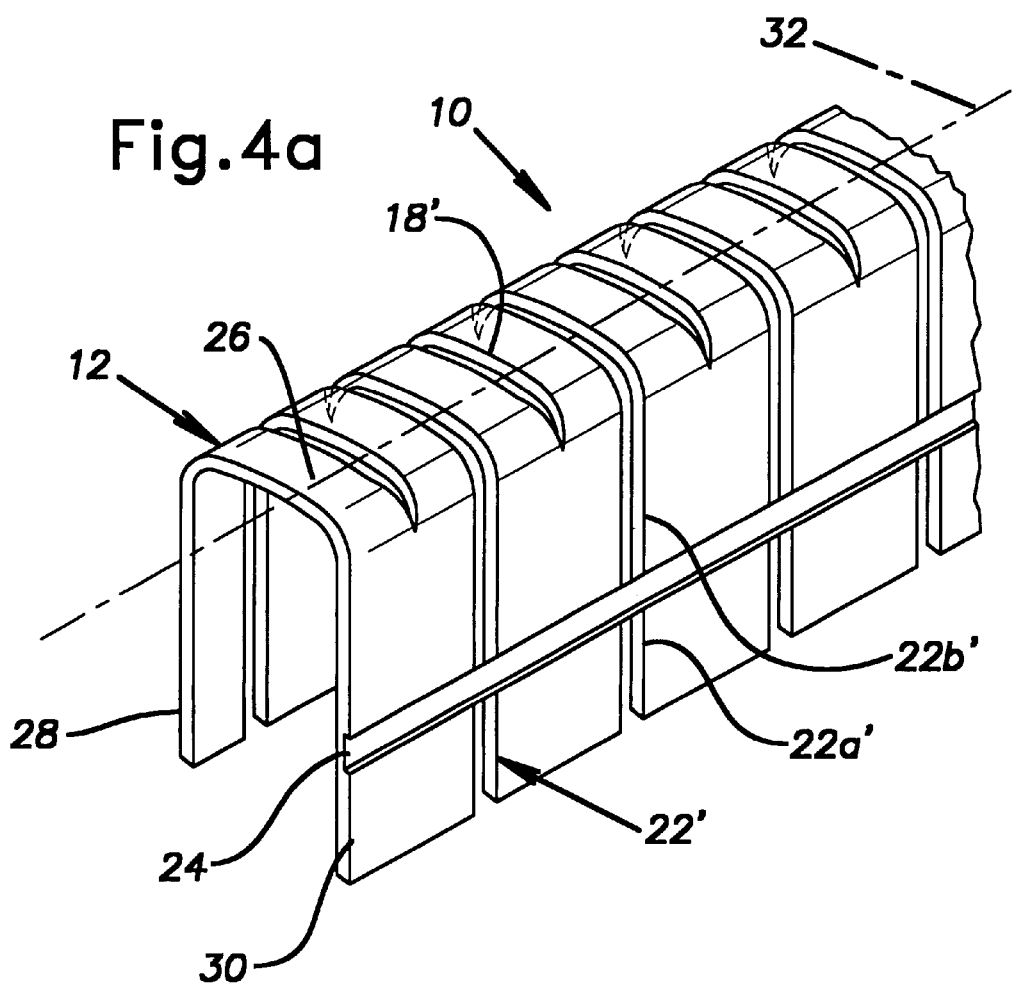

CORE METAL INSERT WITH STAGGER AND OFFSET BACKBONE

BACKGROUND OF THE INVENTION

The present invention generally relates to reinforcing carriers or core metal inserts for weatherseals and, more particularly to weatherseals used on components of motor vehicles such as luggage trunks, engine compartments, doors, and windows.

Weatherseals typically have a channel-shaped form for gripping flange joints such as those which extend around openings in motor vehicles. The weatherseals typically include a channel-shaped reinforcing carrier which is embedded within a flexible covering material such as plastic, rubber, polyurethane, or other elastomer. The carriers should be sufficiently strong to perform their desired gripping function yet sufficiently flexible to allow the weatherstrip to be curved or bent to fit the contours of the flanges upon which the weatherseal is mounted.

There are many different types of reinforcing carriers. For example, U.S. Pat. No. 4,749,203 to Bright discloses a reinforcing carrier in metal blank form which is inscribed with a plurality of slits. The slits are of a first type and a second type. Each slit of the first type extends from one edge of the metal blank, through the center of the metal blank, but stops short of the other edge of the blank. Each slit of the second type extends from the opposite edge of the blank to the center of the blank. The blank is then stretched to open the slits into V-shaped slots and formed into a U-shaped channel. The slots of the first type extend from the edge of a first leg of the channel, across the entire first leg, across the entire base of the channel, and partially into a second leg of the channel. The slots of the second type extend from an edge of the second leg of the channel, entirely across the second leg, and across a portion of the base of the channel to the center of the base.

Although this type of carrier advantageously increases the flexibility of the weatherseal so that the weatherseal can be easily bent, it has been found that the increased flexibility allows weatherseals having seal members, such as bulbs or lips, to be deformed in an undesirable manner. The seal members of the covering material tend to flatten out and/or roll over at points of curvature. Such flattening out and roll over degrades the weatherseals ability to perform its sealing and insulating functions.

It has also been found that this type of carrier strip allows shrinkage of the weatherseal. Weatherseals which are cut to a desired length after extrusion of the coating material, change in length during storage and/or handling due to shrinkage. Therefore, it is necessary to initially cut the weatherseal to a rough relatively long length and to later cut the weatherseal to an exact desired length after several days and the shrinkage has stopped. This secondary cutting results in increased manufacturing costs and/or wasted material. Alternatively, it is necessary to wait several days after the extrusion of the outer coating material before the weatherseals are cut to the exact desired length. This delay, however, results in increased manufacturing costs, inventory costs, and/or shipping costs.

Accordingly, there is a need in the art for an improved reinforcing carrier for a weatherseal which provides sufficient flexibility so that the weatherseal is easily bent without undesirable deformation of the seal member and without undesirable shrinkage.

BRIEF SUMMARY OF THE INVENTION

The present invention provides an elongate carrier for reinforcing a resilient weatherseal which overcomes at least some of the above-noted problems of the related art. According to the present invention, the carrier includes opposed and longitudinally extending first and second edges, a plurality of longitudinally spaced apart first slots transversely extending from the first edge, a plurality of longitudinally spaced apart second slots transversely extending from the second edge, and a longitudinally extending continuous connection interrupting the second slots. The second slots are longitudinally offset from the first slots and transversely overlap the first slots. The first and second slots provide sufficient flexibility to easily bend the weatherseal. The continuous connection increases the tensile strength of the carrier to enable the weatherseal to be formed by an extrusion process and eliminates shrinkage of the weatherseal. The continuous connection also allows the neutral axis, of the final cross section of the weatherseal, to be precisely located.

According to another aspect of the present invention, a resilient weatherseal includes an elongate reinforcing carrier and a flexible material covering the reinforcing carrier. The elongate reinforcing carrier has opposed and longitudinally extending first and second edges, a plurality of longitudinally spaced apart first slots transversely extending from the first edge, a plurality of longitudinally spaced apart second slots transversely extending from the second edge, and a longitudinally extending continuous connection interrupting the second slots. The second slots are longitudinally offset from the first slots and transversely overlapping the first slots. In many cases, the flexible material includes a sealing member, such as a bulb or a lip. The continuous connection of the reinforcing carrier, which defines a neutral axis of the weatherseal, is preferably located adjacent to and/or behind the sealing member. The continuous connection, however, can also be located away from the sealing member. Locating the neutral axis adjacent to the sealing member enhances the sealing properties of the seal member by reducing flattening out and rollover problems. Additionally, increased design flexibility is achieved because the continuous connection can be located to match-up with the sealing member which is positioned where it is needed.

BRIEF DESCRIPTION OF THE SEVERAL VIEWS OF THE DRAWING

These and further features of the present invention will be apparent with reference to the following description and drawings, wherein:

FIG. 1 is a fragmentary view of a reinforcing carrier in blank metal form according to the present invention;

FIG. 2a is an enlarged fragmentary view of the reinforcing carrier of FIG. 1 after it has been lengthened to expand the slits into slots;

FIG. 2b is an end view of the reinforcing carrier of FIG. 2;

FIG. 3 is fragmentary perspective view of the reinforcing carrier of FIG. 2a after it has been formed into a channel shape and showing is flexibility to bend on the z-axis;

FIG. 4 is an enlarged perspective view of an end portion of the reinforcing carrier of FIG. 3;

FIG. 4a is an enlarged perspective view similar to FIG. 4 but showing a variation of the reinforcing carrier;

FIG. 5 is a cross-sectional view of a weatherseal including the reinforcing carrier of FIG. 2a;

FIG. 6 is a perspective view of a weatherseal including the reinforcing carrier of FIG. 3;

DETAILED DESCRIPTION OF PREFERRED EMBODIMENTS

Figure 7:
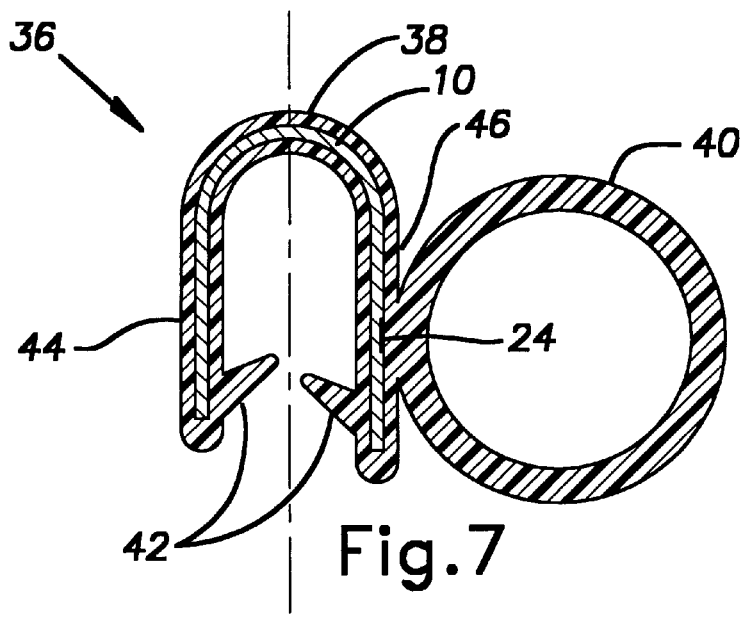
FIG. 7 is a cross-sectional view of the weatherseal of FIG. 6 having the reinforcing carrier of FIG. 3.

FIGS. 1 to 4 illustrate a core metal insert or carrier 10 for reinforcing a weatherseal according to the present invention. FIG. 1 illustrates metal blank or strip 12 having opposed, generally parallel, and lengthwise extending first and second edges 14, 16. The metal strip 12 preferably comprises a metal such as, for example, a coated steel, an electrogalvanized steel, a mild steel, a stainless steel, or an aluminum alloy. Typically, the metal strip 12 has a thickness of about 0.016 inches to about 0.050 inches and a width of about ¾ inch to about 4 inches.

Along the first edge 14 is a plurality of longitudinally spaced-apart first slits 18 which transversely extend from the first edge 12 to generally the longitudinal centerline 20 of the carrier 10. The first slits 18 are preferably equally spaced apart with respect to each other. Along the second edge 16 is a plurality of longitudinally spaced-apart second slits 22 which transversely extend from the second edge 16 to a point generally beyond the longitudinal centerline 20 of the strip 12. The second slits 22 are preferably equally spaced apart with respect to each other. Additionally, the spacing of the first slits 18 and the spacing of the second slits 22 is preferably equal.

The first and second slits 18, 22 are longitudinally offset with respect to each other, that is, each of the first slits 18 are at different longitudinal positions than the second slits 22. Arranged in this manner, the slits 18, 22 alternately extend from the opposite edges of the strip in a staggered manner. Preferably, the first slits 18 are spaced about halfway between adjacent second slits 22 and the second slits 22 are spaced about halfway between adjacent first slits 18.

The first and second slits 18, 22 are also transversely overlapped, that is, each of the first slits 18 transversely extend past the inner end of the second slits 22 and/or the second slits 22 transversely extend past the inner end if the first slits 18. The overlap is transversely offset from the longitudinal centerline 20 of the insert because the first slits 18 extend to the centerline 20 and the second slits 22 transversely extend beyond the centerline 22. The arrangement of the slits 18, 22, therefore, is asymmetric with respect to the centerline 20.

The second slits 22 are interrupted by a longitudinally extending continuous connection or backbone 24, that is, an unslit region which longitudinally extends for the entire length the strip 12. The continuous strip 24 is transversely offset from the centerline 20 of the strip 12. The continuous connection 24 is on the transverse side of the strip 12 opposite the first slits 18 and therefore interrupts the second slits 22 but not the first slits 18. The second slits 22 are interrupted by the continuous connection 24 such that there is a first or outer portion 22a extending from the second edge 16 to the connecting portion 24 and second or inner portion 22b extending from the connecting portion 24 to the inner end of the second slit 22 beyond the centerline 20. The continuous connection 24 is advantageous because it dramatically increases the tensile strength of the metal carrier 10 and defines a neutral axis, when the weatherseal is formed, which can be desirably located as discussed in more detail hereinafter. A neutral axis is a point in the cross-section of the carrier or weatherseal which is in neither tension nor compression.

As best shown in FIGS. 2 and 2a, the strip 12 is expanded by applying a force to lengthen the strip 12 and longitudinally expand or open-up the slits 18, 22 to form generally V-shaped slots 18', 22'. The force may be applied to the strip 12 either during or after the slitting process and can be applied in any known manner such as by passing the strip through a pair of pinch rolls or expanding via a coining die. As shown in the illustrated embodiment, the continuous connection 24 provides an ideal location for applying pinch rolls to expand the strip 12, resulting in a reduced material thickness at the continuous connection 24.

As best shown in FIGS. 3 and 4, the carrier 10 is preferably formed to have a longitudinally extending channel or U-shaped cross-section. The carrier 10 has a base portion 26, a first or distal leg portion 28, and a second or proximal leg portion 30. The distal and proximal leg portions 28, 30 can be the same or different lengths. The illustrated strip 12 is asymmetrically bent to form the channel, that is, the centerline 20 of the strip 12 is not located at the longitudinal centerline or z-axis 32 of the channel so the leg portions 26, 28 have different lengths. The continuous strip 24 is transversely offset from the centerline 32 of the channel as well as the centerline of the strip 12 and is located on the second leg portion 28.

The slots 18', 20' can also be asymmetrical or symmetrical with respect to the base portion 26. In the illustrated embodiment, the centerline 32 of the channel is generally aligned with the inner end of the second slots 22' so that the slots 18', 22' are asymmetrical with respect to the base portion 26. The second slots 22' extend partially across the second leg portion 30 and partially across the base portion 26 of the channel to about the centerline 32 of channel. The first slots 18' on the other hand, extend entirely across the first leg portion 28, entirely across the base portion 26, and preferably partially into the second leg portion 20.

The asymmetric arrangement of the slots 18', 22' is advantageous because it enables the carrier 10 to be easily curved about a vertical axis 34 (as viewed in FIG. 3). One side (A—A) of the carrier 10 is able to compress or stretch while the other side (B—B) doesn't change length when the carrier 10 is bent to follow a curve. The side (A—A) of the carrier 10 on the outside of the bend has the first slots 18' and can stretch relatively easily. Similarly, that side (A—A) of the carrier 10 can be easily compressed if on the inside of the bend. The side (B—B) of the carrier 10 on the inside of the bend, has the connecting portion 24 which defines the neutral axis and thus does not change length.

As best shown in FIG. 4a, the slots 18', 20' can alternatively be symmetrical with respect to the base portion 26. In the illustrated embodiment, the transverse overlap of the slots 18', 22' is centered about the centerline 32 of channel. Locating the slots 18', 22' symmetrical with respect to the centerline 32 is advantageous because it allows more flexibility in all four directions.

The reinforcing carrier 10 is also advantageous because of its one-piece construction, that is, it is a single elongate metal strip 12 and does not comprise a series of separate elements along the length of the weatherstrip 36. Such separate elements are not easy to handle during the extrusion process. Typically, a reinforcing carrier with separate elements is initially made in one-piece form (so as to permit it to be fed into the extruder) and then separated into multiple segments (such as by breaking frangible interconnecting links) after the extrusion process. This allows shrinkage and bulb deformation.

As best shown in FIGS. 5 to 7, a weatherseal 36 is preferably formed by passing the reinforcing carrier 10 through an extruder to embed the insert within an outer layer of coating material 38. The coating material 38 is preferably a resilient and flexible material such as, for example, an elastomer, thermal plastic, rubber, polyvinylchloride (PVC), or polyurethane.

The coating material 38 typically includes an integrally extruded or subsequently attached sealing member 40 such as, for example, the illustrated bulb section or a lip. The sealing member 40 is typically a sponge elastomer or other suitable material. The sealing member 40 is preferably located substantially adjacent to and more preferably directly at the continuous connecting portion 24 which defines the neutral axis of the weatherseal 40. Rollover of the bulb section and/or flattening of the lip is prevented or reduced, controllable by bulb design, at curves because the continuous connecting portion 24 resists stretching and compression. The sealing member 40 can alternatively be located at other positions such as, for example, at the base portion 26.

The coating material 38 also typically includes integrally extruded gripping lips 42. The gripping lips 42 longitudinally extend along the length of the channel and extend from the inner sides of opposite walls 44, 46 of the channel. As illustrated, there can be any number of gripping lips 42 provided and an equal or unequal number of gripping lips 42 on the opposite walls 44, 46.

The reinforcing carrier 10 can pass through the extruder in the flat unformed shape (as shown in FIG. 5) or can be formed into the channel shape prior to passing through the extruder (as shown in FIG. 6). It is especially beneficial to extrude the reinforcing carrier 10 in the flat unformed shape when the reinforcing carrier 10 is designed to be broken into a series of separate elements along the length of the weather strip 36. Normally, however, the formation of the channel shape takes place prior to or as the reinforcing carrier 10 passes through the extruder and is covered with the coating material 38. The reinforcing carrier 10 is typically formed prior to extrusion to allow better orientation of the bulb section in the cross-section.

Figure 8:
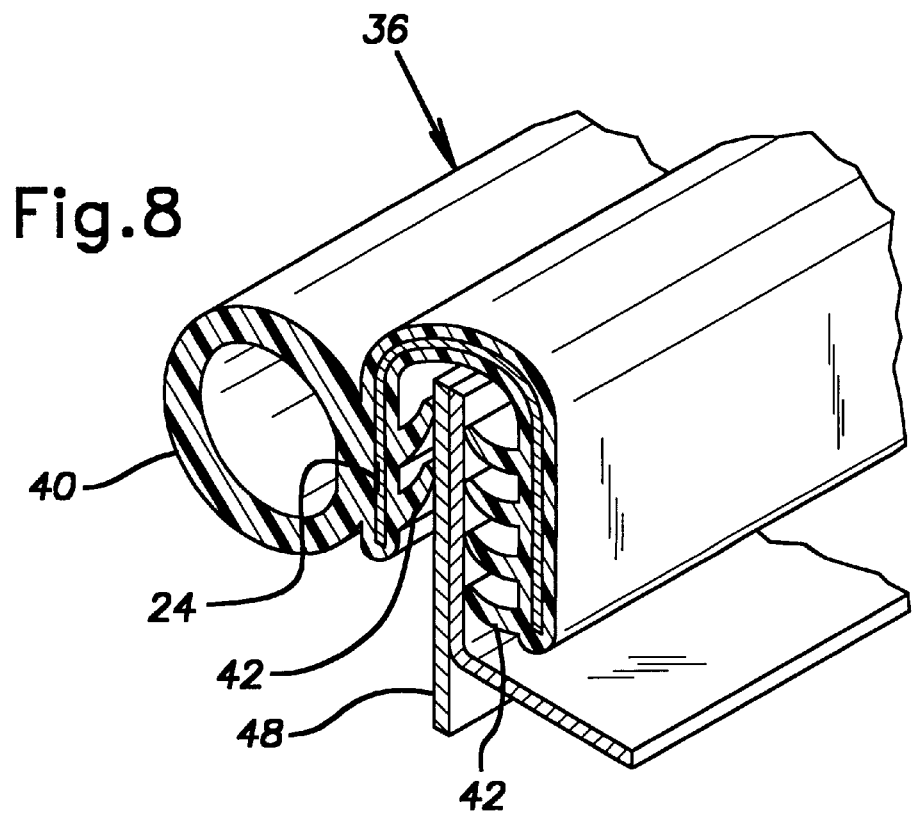
FIG. 8 is a perspective view, in cross-section, of the weatherseal of FIG. 6 installed on a metal flange of a motor vehicle.

As best shown in FIG. 8, when the weatherseal 36 is secured to a metal flange 48 of a motor vehicle, the asymmetric arrangement of the slots of the carrier 10 enables the weatherseals 36 to be easily curved without deforming the sealing member 40. Therefore, the reinforcing carrier 10 is particularly well suited for weatherseals 36 which need to be curved in this fashion such as, for example, weatherseals 36 fitted to luggage compartments, engine compartments, and door openings.

The illustrated reinforcing carrier 10 is preferably produced by first slitting a flat metal blank as shown in FIG. 1 and described hereinabove. The metal blank is then stretched by means of rolling action or stamp coining, resulting in the slits 18, 22 opening up into the slots 18', 22'. This process is advantageous because no portion of the metal strip 12 is wasted, in fact since the metal strip 12 is being stretched, more longitudinal length is available after the stretching process than before the stretching process. It is noted however, that the reinforcing carrier can be produced in a number of other ways within the scope of the present invention. For example, the slots 18', 22' can be cut or stamped-out by means of a press.

Although particular embodiments of the invention have been described in detail, it will be understood that the invention is not limited correspondingly in scope, but includes all changes and modifications coming within the spirit and terms of the claims appended hereto.

What is claimed is:

1. An elongate carrier for reinforcing a resilient weatherseal, said carrier comprising opposed and longitudinally extending first and second edges, a plurality of longitudinally spaced apart first slots transversely extending from said first edge, a plurality of longitudinally spaced apart second slots transversely extending from said second edge, said second slots being longitudinally offset from said first slots and transversely overlapping said first slots, a longitudinally extending continuous connection interrupting said second slots at an intermediate point along said second slots and spaced apart from both said second edge and a centerline of the carrier located midway between said first and second edges, portions of said second slots on opposite sides of said continuous connection being aligned, and only one longitudinally-extending width of reduced material thickness, wherein said width of reduced material thickness is located along said continuous connection.

2. The carrier according to claim 1, wherein said continuous connection is transversely offset from a longitudinally extending centerline between said edges.

3. The carrier according to claim 1, wherein said second slots extend a distance greater than one half a transverse distance between said edges.

4. The carrier according to claim 3, wherein said first slots extend a distance generally equal to one half the transverse distance between said edges.

5. The carrier according to claim 1, wherein said first and second slots alternately extend from said first and second edges respectively.

6. The carrier according to claim 1, wherein said transverse overlap of first and second slots is transversely offset from a longitudinally extending centerline between said edges.

7. The carrier according to claim 1, wherein said continuous connection is the only longitudinally-extending continuous connection.

8. The carrier according to claim 1, wherein said continuous connection has a constant thickness in a longitudinal direction.

9. An elongate carrier for reinforcing a resilient weatherseal, said metal insert comprising a base portion, first and second leg portions extending from opposite sides of said base portion to form a generally U-shaped cross section, said first and second leg portions having longitudinally extending first and second edges respectively, a plurality of longitudinally spaced apart first slots transversely extending from said first edge of said first leg portion, a plurality of longitudinally spaced apart second slots transversely extending from said second edge of said second leg portion, said second slots being longitudinally offset from said first slots and transversely overlapping said first slots, a longitudinally extending continuous connection interrupting said second slots at an intermediate point along said second slots and spaced apart from both said second edge and a centerline of the carrier located midway between said first and second edges, portions of said second slots on opposite sides of said continuous connection being aligned, and only one longitudinally-extending width of reduced material thickness, wherein said width of reduced material thickness is located along said continuous connection.

10. The carrier according to claim 9, wherein said continuous connection is located on said second leg portion.

11. The carrier according to claim 9, wherein a transverse overlap of said first and second slots is substantially centered on said base portion.

12. The carrier according to claim 9, wherein said second slots transversely extend across said second leg portion and at least a portion of said base portion.

13. The carrier according to claim 12, wherein said second slots transversely extend across about one half a transverse distance of said base portion.

14. The carrier according to claim 9, wherein said first slots and said second slots each transversely extend entirely across said base portion.

15. The carrier according to claim 9, wherein said first slots transversely extend entirely across said first leg portion and said base portion and across at least a portion of said second leg portion.

16. The carrier according to claim 9, wherein said first and second slots alternately extend from said first and second edges respectively.

17. The carrier according to claim 16, wherein said first slots are generally equidistant from each other, said second slots are generally equidistant from each other, and each of said second slots are longitudinally offset from said first slots by generally one half a longitudinal distance between adjacent first slots.

18. The carrier according to claim 9, wherein said transverse overlap of first and second slots is transversely offset from a longitudinally extending centerline of said base portion between said leg portions.

19. The carrier according to claim 9, wherein said continuous connection is the only longitudinally-extending continuous connection.

20. The carrier according to claim 9, wherein said continuous connection has a constant thickness in a longitudinal direction.

21. A flexible weatherseal comprising:
an elongate metal reinforcing carrier having opposed and longitudinally extending first and second edges, a plurality of longitudinally spaced apart first slots transversely extending from said first edge, a plurality of longitudinally spaced apart second slots transversely extending from said second edge, said second slots being longitudinally offset from said first slots and transversely overlapping said first slots, a longitudinally extending continuous connection interrupting said second slots at an intermediate point along said second slots and spaced apart from both said second edge and a centerline of the carrier located midway between said first and second edges, portions of said second slots on opposite sides of said continuous connection being aligned, and only one longitudinally-extending width of reduced material thickness, wherein said width of reduced material thickness is located along said continuous connection; and
a flexible material covering said reinforcing carrier.

22. The weatherseal according to claim 21, wherein said flexible material includes a sealing member located adjacent said continuous connection of said reinforcing carrier.

23. A flexible weatherseal comprising:
an elongate metal reinforcing carrier having a base portion, first and second leg portions extending from opposite sides of said base portion to form a generally channel-shaped cross section, said first and second leg portions having longitudinally extending first and second edges respectively, a plurality of longitudinally spaced apart first slots transversely extending from said first edge of said first leg portion, a plurality of longitudinally spaced apart second slots transversely extending from said second edge of said second leg portion, said second slots being longitudinally offset from said first slots and transversely overlapping said first slots, a longitudinally extending continuous connection interrupting said second slots at an intermediate point along said second slots and spaced apart from both said second edge and a centerline of the carrier located midway between said first and second edges, portions of said second slots on opposite sides of said continuous connection being aligned, and only one longitudinally-extending width of reduced material thickness, wherein said width of reduced material thickness is located along said continuous connection; and
a flexible material covering said reinforcing carrier.

24. The weatherseal according to claim 23, wherein said flexible material includes a sealing member located adjacent said continuous connection.

25. The weatherseal according to claim 24, wherein said continuous connection is located on said second leg portion of said reinforcing carrier.

26. The weatherseal according to claim 23, wherein said first slots transversely extend entirely across said first leg portion and said base portion of said reinforcing carrier.

27. The weather strip according to claim 26, wherein said second slots transversely extend across said second leg portion and at least a portion of said base portion of said reinforcing carrier.

* * * * *